(12) United States Patent
Biswas et al.

(10) Patent No.: US 9,456,464 B2
(45) Date of Patent: Sep. 27, 2016

(54) MULTIPATH TCP SUBFLOW ESTABLISHMENT AND CONTROL

(71) Applicant: Apple Inc., Cupertino, CA (US)

(72) Inventors: Anumita Biswas, Santa Clara, CA (US); Joshua V Graessley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 458 days.

(21) Appl. No.: 13/911,759

(22) Filed: Jun. 6, 2013

(65) Prior Publication Data

US 2014/0362765 A1   Dec. 11, 2014

(51) Int. Cl.
*H04W 76/02*   (2009.01)
*H04L 12/707*   (2013.01)

(52) U.S. Cl.
CPC ........... *H04W 76/026* (2013.01); *H04L 45/24* (2013.01)

(58) Field of Classification Search
CPC ....... H04L 69/14; H04L 45/24; H04L 69/16; H04L 69/163; H04W 88/06; H04W 76/025
See application file for complete search history.

(56) References Cited

U.S. PATENT DOCUMENTS

| | | | |
|---|---|---|---|
| 8,750,188 B2 | 6/2014 | Nicoara et al. | |
| 2012/0188949 A1 | 7/2012 | Salkintzis et al. | |
| 2012/0271938 A1* | 10/2012 | Livet et al. | 709/224 |
| 2012/0331160 A1* | 12/2012 | Tremblay et al. | 709/228 |
| 2013/0031256 A1* | 1/2013 | Hampel | 709/227 |
| 2013/0114481 A1* | 5/2013 | Kim et al. | 370/310 |
| 2013/0155876 A1 | 6/2013 | Potra et al. | |
| 2013/0208713 A1 | 8/2013 | Hamade et al. | |
| 2013/0279331 A1 | 10/2013 | Pluntke et al. | |
| 2013/0318239 A1* | 11/2013 | Scharf et al. | 709/224 |
| 2014/0173123 A1 | 6/2014 | Graessley et al. | |

FOREIGN PATENT DOCUMENTS

WO   2013144547   10/2013

OTHER PUBLICATIONS

Ford et al. "TCP Extensions for Multipath Operation with Multiple Addresses", Jan. 2013, IETF, pp. 1-64.*

* cited by examiner

*Primary Examiner* — Jung Park
(74) *Attorney, Agent, or Firm* — Meyertons Hood Kivlin Kowert & Goetzel, P.C.; Jeffrey C. Hood

(57) ABSTRACT

Techniques for electronic devices to control a multipath transmission control protocol (MPTCP) connection. An MPTCP connection between two endpoints may be established. The MPTCP connection may include at least one MPTCP subflow. At least one of the endpoints may be configured to act as a master with respect to the MPTCP connection. The master may perform one or more control operations on the MPTCP connection, while if one of the endpoints is not a master, that endpoint may not perform control operations on the MPTCP connection. The control operations may include initiating or establishing new MPTCP subflows or modifying a priority level of one or more MPTCP subflows of the MPTCP connection.

14 Claims, 6 Drawing Sheets

```
                          1                   2                   3
      0 1 2 3 4 5 6 7 8 9 0 1 2 3 4 5 6 7 8 9 0 1 2 3 4 5 6 7 8 9 0 1
     +---------------+---------------+-------+-------+---------------+
     |     Kind      |    Length     |Subtype|Version|A|B|C|D|E|F|G|H|
     +---------------+---------------+-------+-------+---------------+
     |                  Option Sender's Key (64 bits)                |
     |                                                               |
     |                                                               |
     +---------------------------------------------------------------+
```

FIG. 8

```
                          1                   2                   3
      0 1 2 3 4 5 6 7 8 9 0 1 2 3 4 5 6 7 8 9 0 1 2 3 4 5 6 7 8 9 0 1
     +---------------+---------------+-------+-------+---------------+
     |     Kind      |    Length     |Subtype|Version|A|B|C|D|E|F|G|H|
     +---------------+---------------+-------+-------+---------------+
     |                 Option Receiver's Key (64 bits)               |
     |                                                               |
     |                                                               |
     +---------------------------------------------------------------+
```

FIG. 9

MULTIPATH TCP SUBFLOW ESTABLISHMENT AND CONTROL

FIELD

The present disclosure relates to electronic devices, and more particularly to a system and method for a wireless device to establish and control multipath TCP subflows.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Some of these standards may serve complementary functions while others may typically be considered competitors attempting to fulfill similar needs amongst consumers. Accordingly, it is common for at least some wireless devices to communicate using multiple wireless technologies or standards. For example, some wireless devices (such as some smart phones, etc.), may be capable of cellular communication as well as Wi-Fi communication.

SUMMARY

Embodiments are presented herein of a method for an electronic device to establish and configure control of multipath TCP (MPTCP) connections and subflows, and an electronic device configured to implement the method.

Techniques for establishing MPTCP connections are described herein, which may take into consideration disparate characteristics of different types of network interfaces. For example, it is noted that many wireless (e.g., mobile) devices may include both Wi-Fi and cellular network interfaces capable of providing data links, while many servers (and other fixed/stationary devices) may primarily or exclusively include wired network interfaces.

Since different network interfaces may have different availabilities, and use preferences with respect to different network interfaces may generally differ, according to some of the techniques presented herein a device may monitor the availability of its network interfaces and/or consider network interface use preferences specific to the device or class of device in determining how and in what order to attempt to establish a MPTCP connection.

Also described herein are techniques for controlling an MPTCP connection. Again considering the disparate characteristics of different types of network interfaces and devices which implement those various types of network interfaces, according to some of the techniques presented herein a device may assert controllership/declare itself to be a master with respect to an MPTCP connection, or in contrast, may assert non-controllership/declare itself to be a slave with respect to an MPTCP connection. In such a way, devices which have stronger network interface use preferences (such as mobile devices, in some cases) may control an MPTCP connection in accordance with their network interface use preferences, while devices with weaker or nonexistent network interface use preferences (such as fixed/stationary devices, in some cases) may avoid unintentionally violating the network interface use preferences of devices with which they establish MPTCP connections.

In assuming roles as master or slave with respect to an MPTCP connection, devices may either assume or relinquish the capability to perform certain control operations on the MPTCP connection. For example, permission to initiate any new MPTCP subflows of an MPTCP connection may be reserved for devices which assume a master role with respect to an MPTCP connection. As another example, permission to modify priority levels of MPTCP subflows of an MPTCP connection may be reserved for devices which assume a master role with respect to an MPTCP connection.

The techniques described herein may be implemented in and/or used with a number of different types of devices, including but not limited to portable media players, cellular phones, tablet computers, set top box devices, television systems, servers, and other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which:

FIGS. 8 and 9 illustrate exemplary MP_Capable option formats.

Figure 1:
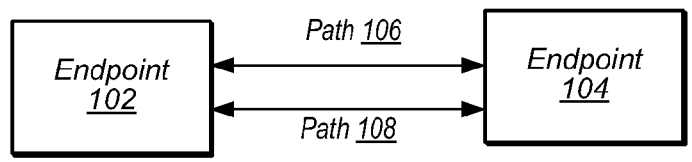
FIGS. 1-2 illustrate exemplary (and simplified) wireless communication systems.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
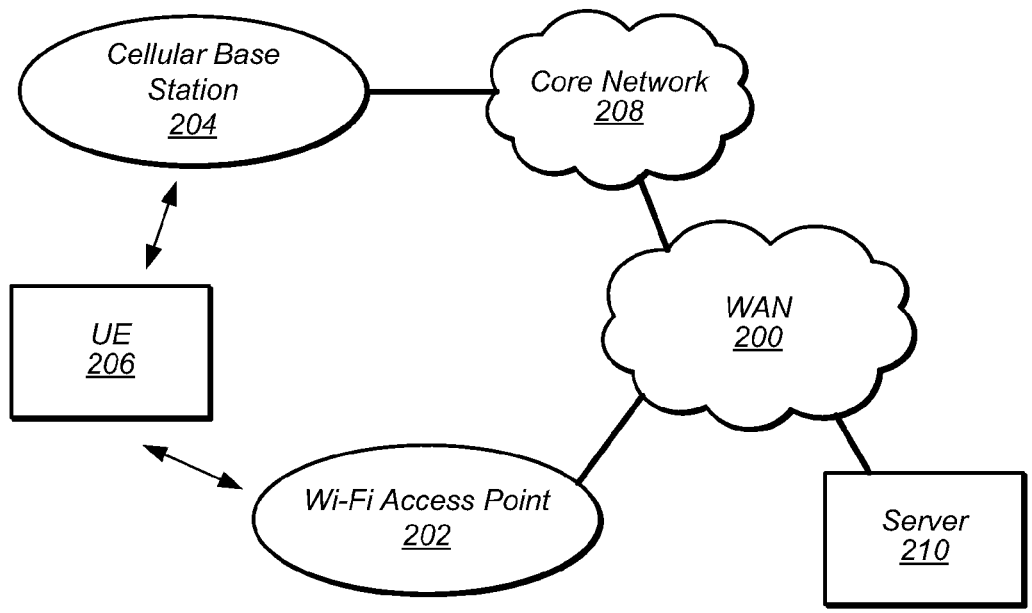

FIGS. 1-2—Communication System

FIGS. 1-2 illustrate exemplary (and simplified) communication systems. It is noted that the systems of FIGS. 1-2 are merely examples of possible systems, and embodiments may be implemented in any of various systems, as desired.

The exemplary wireless communication system illustrated in FIG. 1 includes two endpoints having multiple communication paths between them. Thus, endpoint 102 may be capable of communicating with endpoint 104 via path 106 or path 108.

Each of endpoint 102 and endpoint 104 may be a 'fixed' or 'mobile' endpoint. A fixed endpoint may be an endpoint which is substantially stationary and/or which communicates by way of one or more wired communication techniques. Some examples might include a server computer providing cloud-based services via the Internet, a personal desktop computer or workstation, set top box or television, etc. A mobile endpoint may be an endpoint which is substantially mobile and/or which communicates by way of one or more wireless communication techniques. Some examples might include a mobile telephone or smart phone, tablet computer, portable gaming device, portable media player, etc. Note that hybrid endpoints which share traits of both fixed and mobile endpoints are also possible. For example, many laptop computers may be capable of performing both wireless (e.g., Wi-Fi) and wired (e.g., Ethernet) communication, and additionally may be capable of substantial movement (e.g., when operating from batter reserve power) or may be substantially stationary (e.g., when docked and/or connected to a wall outlet for power) at various times.

One or both of endpoints 102, 104 may be multihomed. For example, one or both of endpoint 102, 104 may be capable of communicating via multiple network interfaces. As such, there may be multiple possible communication paths 106, 108 between endpoints 102, 104. Note that although two paths (i.e., path 106 and path 108) are illustrated in FIG. 1, it should be noted that any number of paths may exist between endpoints. For example, if each of endpoints 102, 104 are capable of communicating via two different network interfaces, there might be four possible communication paths between them. Other numbers of different network interfaces and possible communication paths are also possible.

The multiple communication paths 106, 108 may be used to establish a multipath transmission control protocol (MPTCP) link or connection between endpoints 102 and 104. For example, one subflow of the MPTCP connection may be established over path 106, while another subflow of the MPTCP connection may be established over path 108. Such an MPTCP connection may be established and configured/controlled according to various aspects of the present disclosure.

The exemplary wireless communication system illustrated in FIG. 2 represents one possible communication system having the characteristics of the exemplary wireless communication system illustrated in FIG. 1. In particular, a first endpoint (i.e., a wireless user equipment ("UE") device 206) may be capable of communicating with another endpoint (i.e., server 210) using either of a first communication path (i.e., via cellular base station 204, core network 208, and wide area network 200) or a second communication path (i.e., via Wi-Fi access point 202 and wide area network 200).

As shown, the UE device 206 communicates with a Wi-Fi access point 202 and with a cellular base station 204. The access point 202 may be an access point providing a wireless local area network (WLAN). The access point 202 may be equipped to communicate with a wide area network (WAN) 200, such as the Internet. Thus, the access point 202 may facilitate communication between the UE 206 and the network 200. The access point 202 and the UE 206 may be configured to communicate over the transmission medium using Wi-Fi, including any of various versions of IEEE 802.11 (e.g., a, b, g, n, ac, etc.). Note that the access point 202 may also facilitate communication between the UE and other computing devices which also participate in the WLAN directly.

The base station 204 may be a base transceiver station (BTS) or cell site (a "cellular base station"), and may include hardware that enables wireless communication with cellular devices (such as UE 206) according to one or more cellular communication protocols. The UE 206 and the cellular base station 204 may communicate using any of various cellular communication technologies such as GSM, UMTS (WCDMA), LTE, LTE-Advanced (LTE-A), 3GPP2 CDMA2000 (e.g., 1xRTT, 1xEV-DO, HRPD, eHRPD), etc.

As shown, the cellular base station may be equipped to communicate with a core network 208 of a cellular service provider. Thus, the base station 204 may facilitate communication between the UE 206 and the core network 208. The core network 208 may in turn be equipped to communicate with WAN 200 (e.g., the Internet, or another wide area network). Note that the core network 208 may also or alternatively be equipped to communicate with one or more other networks (e.g., a telecommunication network such as a public switched telephone network (PSTN), one or more core networks of other cellular service providers, etc.). The cellular base station 204 may thus provide the UE 206 (and potentially numerous other UEs) with various telecommunication capabilities, such as voice and SMS services (e.g., typically via circuit-switched wireless links) and/or data services (e.g., typically via packet-switched wireless links).

Thus, UE 206 may be capable of communicating using multiple wireless communication standards, including at least one wireless networking protocol (e.g., Wi-Fi) and at least one cellular communication protocol (e.g., GSM, UMTS (WCDMA), LTE, LTE-Advanced (LTE-A), 3GPP2 CDMA2000 (e.g., 1xRTT, 1xEV-DO, HRPD, eHRPD), etc.). Note additionally that the UE 206 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. In addition, or as an alternative, the UE 106 may be capable of communicating using one or more wired communication standards. For example, the UE 206 may be capable of communicating with one or more wired access points, e.g., via Ethernet. It may, for example, be possible for the UE 206 to couple via wired means to the Wi-Fi access point 202 in addition to or as an alternative to utilizing Wi-Fi communication. Other combinations of wireless and wired communication standards (including more than two wireless and/or wired communication standards) are also possible.

The server 210 may also be equipped to communicate with WAN 200. The server 210 may, for example, be a server in a server farm configured to provide a cloud-based service via the Internet. It should be noted that while the server 210 is shown as being directly connected to WAN 200, it may be the case that the server 210 is connected to the WAN 200 by one or more intermediary devices and/or entities, such as gateways, routers, firewalls, and/or any of various other "middleboxes". In addition, it should be noted that while not explicitly shown, the server 210 may include any number of network interfaces for connecting to the WAN 200, including one or more wired network interfaces and/or one or more wireless network interfaces.

Figure 3:
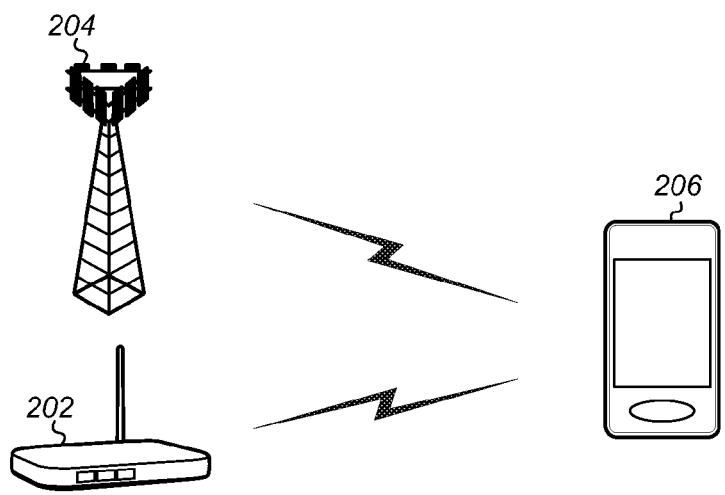
FIG. 3 illustrates a cellular base station and a Wi-Fi access point in communication with a wireless user equipment device.

FIG. 3 illustrates the UE device 206 in communication with the cellular base station 204 and the Wi-Fi access point 202. The UE 106 may be a device with multiple wireless network connectivity such as a mobile phone, a hand-held device, a computer or a tablet, or virtually any type of wireless device.

The UE 206 may include a processor that is configured to execute program instructions stored in memory. The UE 206 may perform any of the method embodiments described herein by executing such stored instructions. Alternatively, or in addition, the UE 206 may include a programmable hardware element such as an FPGA (field-programmable gate array) that is configured to perform any of the method embodiments described herein, or any portion of any of the method embodiments described herein.

The UE 206 may be configured to communicate using any of multiple wireless communication protocols. For example, the UE 206 may be configured to communicate using at least one cellular communication protocol (such as CDMA2000, LTE, LTE-A, etc.) and Wi-Fi. Other combinations of wireless and/or wired communication standards are also possible.

The UE 206 may include one or more antennas for communicating using one or more wireless communication protocols. The UE 206 may share one or more parts of a receive and/or transmit chain between multiple wireless communication standards; for example, the UE 206 might be configured to communicate using either of CDMA2000 (1×RTT/1×EV-DO/HRPD/eHRPD) or LTE using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, the UE 206 may include separate transmit and/or receive chains (e.g., including separate antennas and other radio components) for each wireless communication protocol with which it is configured to communicate. As a further possibility, the UE 206 may include one or more radios or radio components which are shared between multiple wireless communication protocols, and one or more radios or radio components which are used exclusively by a single wireless communication protocol. For example, the UE 206 might include a shared radio for communicating using either of LTE or CDMA2000 1×RTT, and separate radios for communicating using each of Wi-Fi and Bluetooth. Other configurations are also possible.

Figure 4:
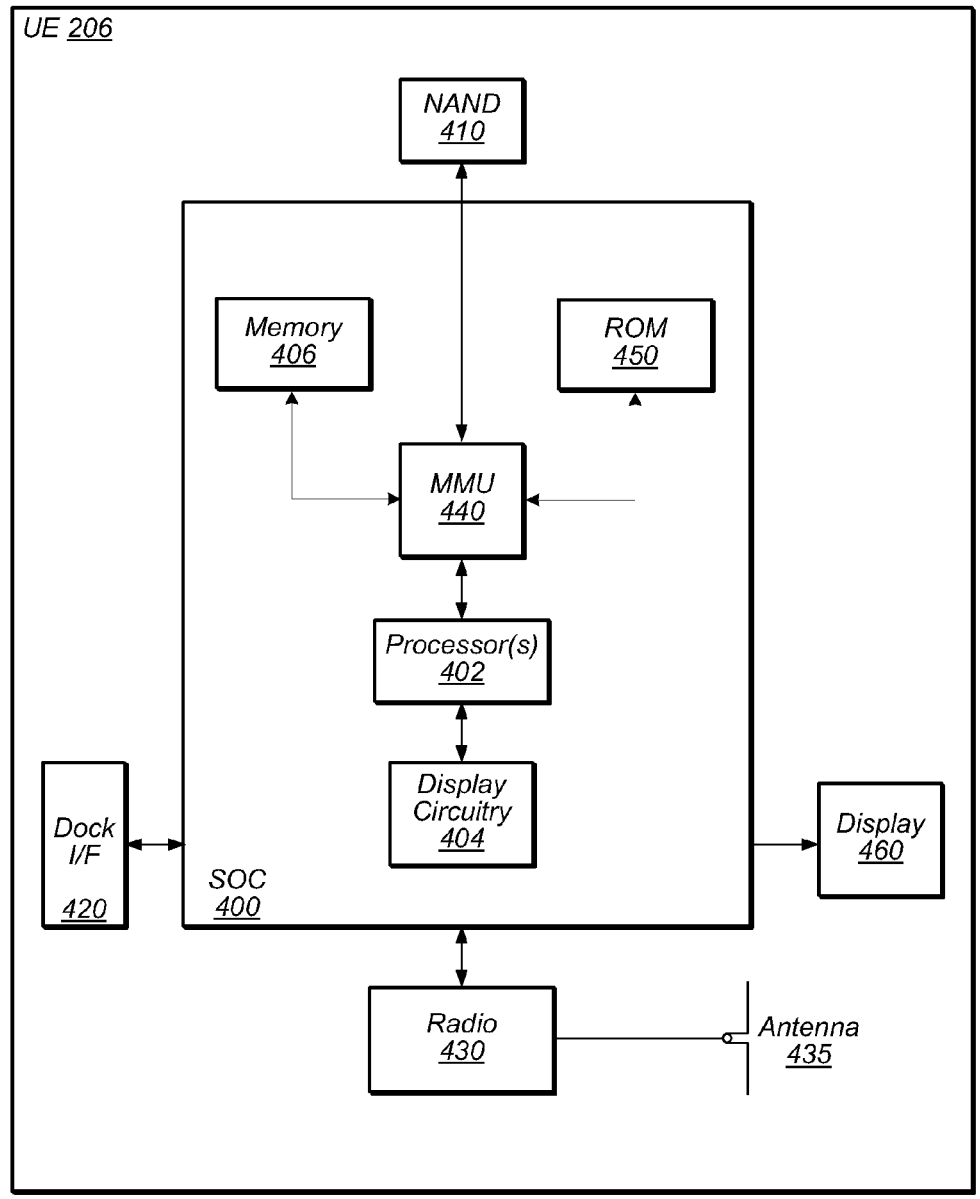
FIG. 4 illustrates an exemplary block diagram of a wireless user equipment device.

FIG. 4—Exemplary Block Diagram of a UE

FIG. 4 illustrates an exemplary block diagram of a UE 206. As shown, the UE 206 may include a system on chip (SOC) 400, which may include portions for various purposes. For example, as shown, the SOC 400 may include processor(s) 402 which may execute program instructions for the UE 206 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (also referred to as a "radio"), connector I/F 420, and/or display 460. The MMU 440 may be configured to perform memory protection and page table translation or set up. In some embodiments, the MMU 440 may be included as a portion of the processor(s) 402.

As shown, the SOC 400 may be coupled to various other circuits of the UE 206. For example, the UE 206 may include various types of memory (e.g., including NAND flash 410), a connector interface 420 (e.g., for coupling to a computer system, dock, charging station, etc.), the display 460, and wireless communication circuitry (or "radio") 430 (e.g., for LTE, LTE-A, CDMA2000, Bluetooth, Wi-Fi, GPS, etc.).

As noted above, the UE 206 may be configured to communicate wirelessly using multiple wireless communication standards. As further noted above, in such instances, the wireless communication circuitry (radio(s)) 430 may include radio components which are shared between multiple wireless communication standards and/or radio components which are configured exclusively for use according to a single wireless communication standard. As shown, the UE device 206 may include at least one antenna (and possibly multiple antennas, e.g., for MIMO and/or for implementing different wireless communication technologies, among various possibilities), for performing wireless communication with base stations, access points, and/or other devices. For example, the UE device 206 may use antenna 435 to perform the wireless communication.

The UE 206 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 5:
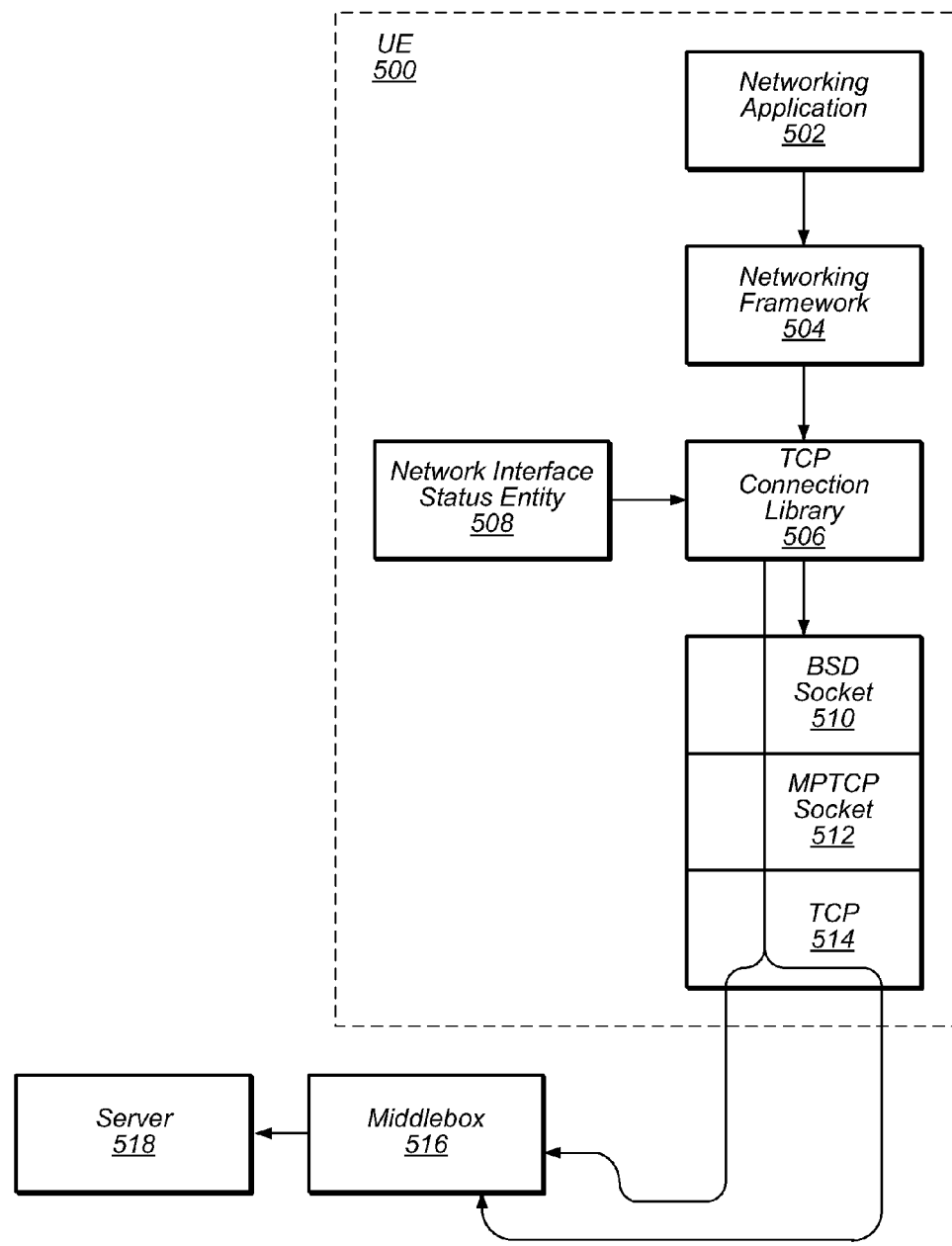
FIG. 5 illustrates an exemplary protocol stack which may be used in conjunction with multipath transmission control protocol communications.
Figure 6:
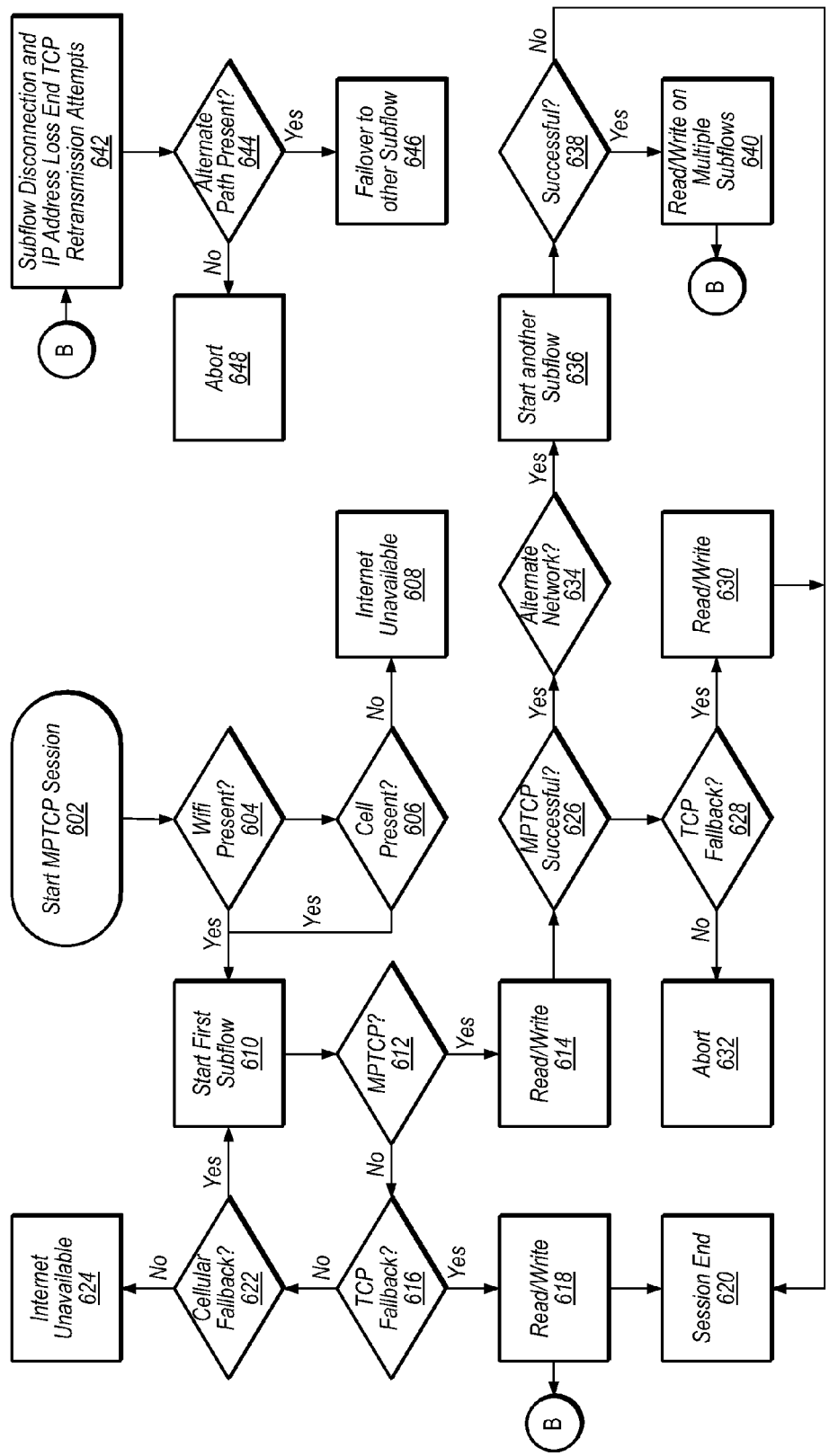
FIG. 6 is a flowchart diagram illustrating aspects of a technique for establishing an MPTCP connection.
Figure 7:
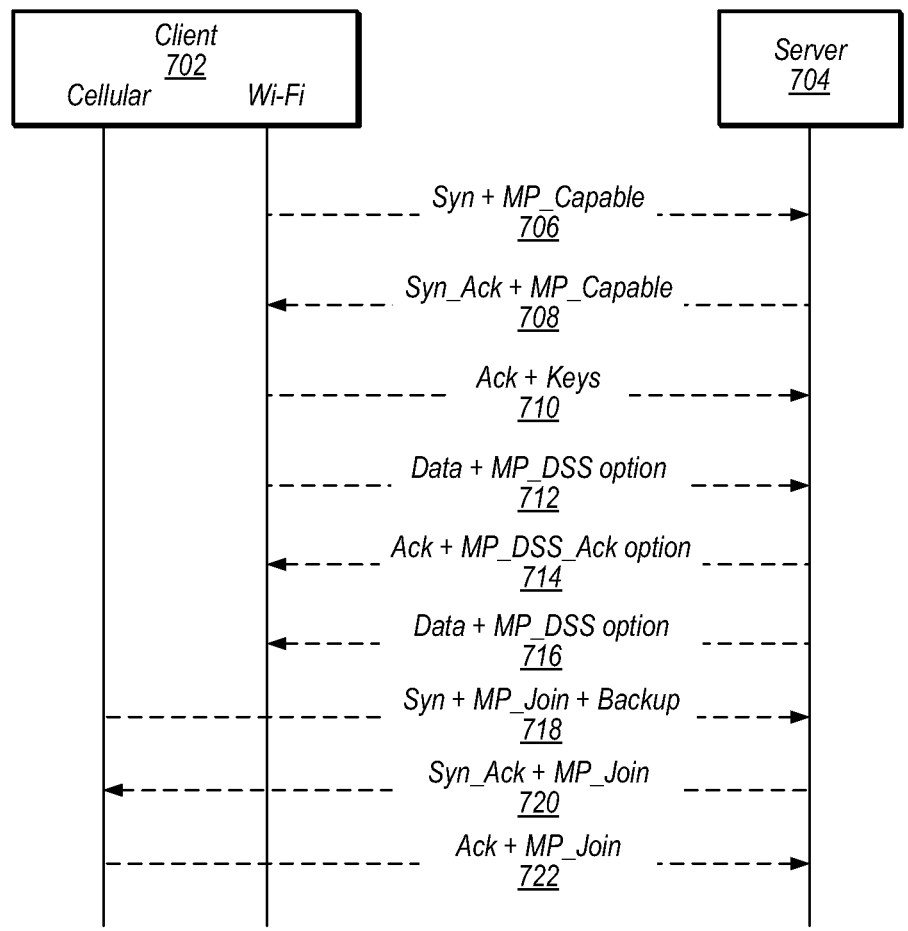
FIG. 7 is a message sequence chart illustrating an exemplary message sequence which may be used as part of establishing an MPTCP connection.

As described herein, the UE 206 may include hardware and software components for implementing features for establishing and/or controlling MPTCP connections, such as those described herein with reference to, inter alia, FIGS. 5-7. The processor 402 of the UE device 206 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 206, in conjunction with one or more of the other components 400, 404, 406, 410, 420, 430, 435, 440, 450, 460 may be configured to implement part or all of the features described herein, such as the features described herein with reference to, inter alia, FIGS. 5-7.

FIG. 5—MPTCP Capable Protocol Stack

FIG. 5 illustrates an exemplary protocol stack which may be used by a UE 500 to establish, configure, and control MPTCP connections and subflows between the UE 500 and a server 518, by way of a middlebox 516, according to various aspects of the present disclosure. It should be recognized that while the exemplary protocol stack illustrated in FIG. 5 represents one possible protocol stack which may be used to implement aspects of the present disclosure, MPTCP connections and subflows may be established, configured, and/or controlled in conjunction with any of numerous alternate protocol stacks, in conjunction with different devices than UE 500 and server 518, and/or without an intermediary middlebox 516 (or with multiple middleboxes). As such, the exemplary protocol stack illustrated in FIG. 5 should not be considered limiting to the disclosure as a whole.

As shown, a networking application 502 may be executing on the UE 500. The networking application may be any application which utilizes a network connection to communicate over a network. For example, the application (or "app") 502 may be a browser application, email application, chat application, social media application, music service application, game application, intelligent personal assistant application, and/or any of a variety of other types of networking applications.

The networking application 502 may interface with a networking framework 504, which may be provided by an operating system executing on the UE 500. The networking framework 504 may provide a level of abstraction between the application 502 and the lower level networking functionality provided by the UE 500. The networking framework 504 may in turn interface with a TCP connection library entity 506. The TCP connection library 506 may have knowledge of the status of various network interfaces, by way of communication with a network interface status entity 508.

The network interface status entity 508 may monitor the up/down status and support network interface upkeep of various network interfaces available to the UE 500. Information regarding the status of the various network interfaces available to the UE 500 may be particularly helpful for a mobile device which is capable of utilizing one or more forms of wireless communication, such as cellular communication and Wi-Fi. For example, the network interface status entity 508 may be aware of whether or not a cellular data link is available at any given time, and may similarly be aware of whether or not a Wi-Fi link is available at any given time. The network interface status entity 508 may similarly monitor any additional or alternative network interfaces as well. In some cases the network interface status entity 508 may also be aware of any further considerations relating to various available network interfaces, such as network interface use preferences. For example, for many mobile devices, Wi-Fi data communication may be less expensive than cellular data communication (e.g., if a cellular service provider offers metered data usage while a Wi-Fi service provider offers unmetered data usage); in such a case, a preference to use a Wi-Fi network interface rather than a cellular network interface for data communication when possible may be noted by the network interface status entity 508 in the UE 500. Other preferences or considerations may also or alternatively be stored.

Being aware of such information by way of its communication with the network interface status entity 508, then, the TCP connection library 506 may act as a transport connection manager and intelligently manage TCP connections for the networking application 502. For example, the TCP connection library 506 may be capable of initiating and tearing down TCP connections (including MPTCP subflows) with networked entities (such as server 518) via various network interfaces, establishing and/or modifying MPTCP subflow priorities, and asserting control over MPTCP subflow creation and priority status modification, such as described further subsequently herein. The TCP connection library 506 may do so by way of socket layers BSD socket 510, MPTCP socket 512, and TCP connection/subflows 514.

As shown, the resulting MPTCP subflows may be established as part of an MPTCP connection with the server 518 by way of the middlebox 516. The middlebox 516 may include any of a variety of types of middlebox functionality, such as a firewall, load balancing, network address translation, etc. Note that in some cases (e.g., depending on middlebox functionality), an MPTCP connection may be terminated at the middlebox 516, which may in turn route data to server 518 in a separate connection (e.g., according to a load balancing algorithm within a server farm).

FIG. 6—MPTCP Subflow Establishment Flowchart

FIG. 6 is a flowchart diagram illustrating an exemplary MPTCP establishment process. The process illustrated in FIG. 6 may particularly be of use for mobile devices (e.g., devices such as the UE 206 illustrated in FIGS. 2-4 and the UE 500 illustrated in FIG. 5). For example, as previously noted, for many such devices, use of a Wi-Fi data link may be preferable for network communications when available because data usage may be unmetered for many Wi-Fi data links, while use of a cellular data link may be preferable for network communications as a backup (e.g., when Wi-Fi and/or other network interfaces are unavailable) because data usage may be metered for many cellular data links. Accordingly, the exemplary MPTCP establishment process may set up an MPTCP connection by first and preferentially attempting to establish a Wi-Fi MPTCP subflow, and subsequently/secondarily attempting to establish a cellular MPTCP subflow if possible.

The method shown in FIG. 6 may be used in conjunction with any of the computer systems or devices shown in the above Figures, among other devices. Some of the method elements shown may be performed concurrently, in a different order than shown, or may be omitted. Additional method elements may also be performed as desired. As shown, the method may operate as follows.

In 602, an MPTCP session may be initiated at a device. The MPTCP session may be initiated as part of operation of a networking application (e.g., such as networking application 502 illustrated in FIG. 5). The MPTCP session may be intended to provide at least one, and preferably multiple communication paths between a first device and a second device in the form of a MPTCP connection. Particularly for a wireless device, establishing multiple communication paths may be desirable in order to provide increased resiliency, e.g., in case one of the communication paths fails (as wireless links sometimes do, particularly under mobile conditions) or is removed. The MPTCP session may be managed by a TCP connection management entity executing on the device, such as the TCP connection library 506 illustrated in FIG. 5.

In 604, it may be determined whether or not a Wi-Fi data link is present. Wi-Fi may be present, for example, if the device is within range of a Wi-Fi access point and the device is configured to communicate with the Wi-Fi access point, such as if the device is located in the home of a user of the device, in a café which has a known Wi-Fi hotspot, in a workplace with a Wi-Fi network, etc. However, in many cases, such as if a user of the device is travelling and is either not within communicative range of any Wi-Fi networks or is not configured to communicate with (e.g., is not a member of) any Wi-Fi networks within communicative range, no Wi-Fi data link may be present. As another possibility, a Wi-Fi data link may not be present if a user of the device has configured the device to power down its Wi-Fi radio.

If a Wi-fi data link is not present, in 606 it may be determined whether or not a cellular data link is present. A cellular data link may be present, for example, if the device is within communicative range of a base station which is capable of providing cellular service (e.g., which may depend on the cellular technology capabilities of the device and the base station, and/or the cellular service provider of the device and operator of the base station). Although cellular networks may typically provide much broader coverage than Wi-Fi networks, in some cases it is also possible that no cellular data link is present, such as if a user of the device is in a remote area which is out of communicative range of any base station or is not configured to communicate with (e.g., is not a subscriber of) any cellular networks within communicative range. Additionally, it may also be possible that a cellular data link may not be present if a user of the device has configured the device to power down its cellular radio.

If neither a Wi-Fi data link nor a cellular data link is available, in 608 it may be determined that the Internet is unavailable at that time. In this case it may not be possible to establish the desired MPTCP session at that time.

If a Wi-Fi data link is present in decision 604, or if no Wi-Fi data link is present in decision 604 but a cellular data link is present in decision 606, in 610 an attempt to establish a first MPTCP subflow may be made. Depending on whether arrived from decision 604 or decision 606, the attempt may be made either on the Wi-Fi data link or the cellular data link.

In 612 it may be determined if the subflow was successfully established as an MPTCP subflow. If the subflow was successfully established as an MPTCP subflow, in 614, read/writes may be performed over the first subflow. If, however, MPTCP negotiation fails, the connection may fall back to regular TCP in 616. If the regular TCP connection is successfully established, in 618 read/writes may be performed over regular TCP until the end of the session at 620.

If both MPTCP and TCP connections fail to be negotiated during an attempt to establish a subflow over Wi-Fi, in 622 a cellular fallback feature may be initiated and, returning to step 610, an attempt to establish an MPTCP subflow over a cellular data link may be performed. If no cellular data link is present when attempting the cellular fallback in step 622, it may be determined in 624 (similar to step 608) that the Internet is unavailable at that time.

Otherwise, a cellular fallback attempt to establish a first MPTCP subflow may follow a similar workflow as an attempt to establish a first MPTCP subflow over a Wi-Fi data link.

Once a first MPTCP subflow is established (e.g., over Wi-Fi or over cellular) and read/writes are being performed over the first subflow in 614, it may be determined whether or not the read/writes over the established MPTCP subflow are successful in 626. As described further subsequently herein with respect to FIG. 7, it may be possible that even if the first subflow is apparently established as an MPTCP subflow, attempted read and/or write operations on the MPTCP subflow may not successfully retain MPTCP characteristics. In this case, in 628 the read/write operations may either be successful as a regular TCP connection (TCP fallback), or may be unsuccessful altogether. If fallback to a regular TCP connection is successful, in 630 read/writes may be performed over regular TCP until the end of the session at 620. If fallback to a regular TCP connection is unsuccessful, in 632 the session may be aborted as unsuccessful.

If, however, in 626 it is determined that at least one read and/or write operation is successful as an MPTCP subflow, in 634 it may be determined whether another network interface is available. Thus, for example, if the first subflow is over a Wi-Fi data link, and a cellular data link is also available, in 636 another MPTCP subflow may be initiated on the cellular data link. Similarly, if the first subflow is over a cellular data link (e.g., if no Wi-Fi was available or subflow setup over Wi-Fi was unsuccessful), and another network interface is also available (e.g., if a Wi-Fi data link has become available, if the device has a further network interface available, or simply as another attempt on an available Wi-Fi data link on which a previous unsuccessful attempt at MPTCP subflow establishment and/or single flow TCP connection establishment was made), in 636 another MPTCP subflow may be initiated on the selected network interface. If, at decision 638, establishing the additional subflow is successful, the session (i.e., the MPTCP connection started in 602) may include performing read and/or write operations over multiple subflows at 640. If, at decision 638, establishing the additional subflow is unsuccessful, returning to 620, read and/or write operations may be performed only on the successfully established subflow until the session ends.

As shown, it is also possible that during a session with at least one active, established subflow, subflow disconnection may occur. For example, a user might move the device out of communicative range of a Wi-Fi access point and thereby lose connectivity on their Wi-Fi data link. In such a case (e.g., from steps 618 or 640 to step 642 via block 'B'), IP address loss may occur and TCP retransmission attempts may fail on the disconnected subflow. It may then be determined in 644 if an alternate path (e.g., another MPTCP subflow) is present. If an alternate path is present, in 646 failover to another subflow may occur. Thus in the above-described exemplary case in which connectivity is lost on a Wi-Fi data link, if an MPTCP subflow on a cellular data link has been established, failover to the cellular subflow may occur, and any read or write operations occurring as part of the session may be performed over that subflow, at least until an additional MPTCP subflow can be re-established. If, however, no alternate path is present at decision 644, the session may be aborted at 648, as no TCP connection may be available at that time.

FIG. 7—Subflow Establishment Message Sequence Chart

FIG. 7 is a message sequence chart illustrating an exemplary message sequence flow between endpoints attempting to set up an MPTCP session with each other via multiple communication paths. In particular, one endpoint, as the endpoint initiating the MPTCP connection, may act as an MPTCP client 702, while the other endpoint may act as the MPTCP server 704. The client 702 may have both a cellular data link as a first network interface and a Wi-Fi data link as a second network interface.

The method shown in FIG. 7 may be used in conjunction with any of the computer systems or devices shown in the above Figures, among other devices. For example, as one possibility, the client 702 may be a wireless user equipment (UE) device such as UE 206 and/or UE 500, while the server might be server 210 and/or server 518, illustrated in and described with respect to various of the above Figures. More generally, either or both of the client 702 and the server 704 may be 'fixed' or 'mobile' endpoints.

Note additionally that some of the messages shown may be transmitted concurrently, in a different order than shown, or may be omitted. Additional messages may also be transmitted as desired. As shown, the sequence may operate according to the following flow.

The client 702 may transmit a Syn message 706 to the server 704 as the first part of a three phase handshake process/connection establishment procedure. As shown, the Syn message 706 may include an MP_Capable option to indicate that the client 702 is requesting establishment of an MPTCP connection rather than a standard (single-path) TCP connection.

If the server 704 is MPTCP capable and no middlebox has dropped or modified the Syn message to remove the MP_Capable option (for example, replaced the MP options with no-operations/NOPs), the server 704 may transmit a Syn_Ack message 708 with an MP_Capable option to indicate that the server 704 acknowledges the MPTCP request of the client 702 and to indicate that the server 704 is also MPTCP capable.

Again if no middlebox has dropped or modified the Syn_Ack message to remove the MP_Capable option, the client 702 may transmit an Ack message 710 to the server 704. The Ack message 710 may also include one or more keys (e.g., for use in authenticating the addition of future subflows to the MPTCP connection), as shown.

Note that if the MP_Capable option is dropped (e.g., by a middlebox) from one or both of the Syn message 706 or the Syn_Ack message 708, but those messages are otherwise delivered intact, the TCP connection may continue to be established as a standard (single-path) TCP connection without any additional delay caused by attempting to establish the TCP connection as an MPTCP subflow. If one or both of the Syn message 706 or the Syn_Ack message 708 are dropped, the client 702 may attempt to retransmit Syn messages with MPTCP options n (being a configurable or predetermined number) times, and then if connection establishment is still unsuccessful, further Syn retransmissions may be made without MPTCP options to fall back to a standard TCP connection. In this case, a certain amount of time (e.g., the amount of time associated with the n retransmission attempts with MPTCP options) may be added to the setup time of the single-path TCP connection.

Once the three-phase MPTCP handshake procedure is successfully completed with the Ack message 710, the client 702 may attempt to transmit data packets 712 over the established MPTCP subflow. As part of an MPTCP subflow, the data packets 712 may include an MP_DSS (data sequence signal) option.

The server 704 may in turn transmit an Ack message 714 with an MP_DSS option in response to the data packets 712. The server may additionally transmit its own data packets 716 to the client 702 over the established MPTCP subflow. These packets 716 may also include an MP_DSS option.

Note that even after a TCP handshake procedure is successfully negotiated with MPTCP options, it may still be possible for a middlebox to drop the MP_DSS option on data or acknowledgement packets. If this occurs, the connection may fall back to a standard TCP connection.

Also, for this reason, the client 702 may wait until after an acknowledgement to at least one data packet with an MP_DSS option, which itself has an MP_DSS option, such as Ack message 714, is received before attempting to establish a second MPTCP sub flow.

If a TCP handshake procedure is successfully negotiated with MPTCP options, and at least one successful read or write operation is performed (i.e., at least one data packet and ACK are successfully transmitted) with MPTCP options intact, and the client 702 has a cellular data link available in addition to the Wi-Fi data link, the client 702 may transmit a Syn message 718 to the server 704 by way of its cellular network interface in order to initiate a handshake procedure to attempt to establish another subflow of the MPTCP connection. As an additional subflow of an existing MPTCP connection, the Syn message 718 may include an MP_Join option. Additionally, since the cellular network interface may not be a preferred network interface relative to the Wi-Fi network interface, the Syn message 718 may include a 'Backup' flag, indicating that the cellular subflow would be a backup.

Similar to the subflow establishment message flow to establish the Wi-Fi subflow, the server 704 may respond by transmitting a Syn_Ack message 720, which may also include an MP_Join option, to the client 702. The client 702 may then follow up with an Ack message 722, which may also include an MP_Join option.

Having successfully established MPTCP subflows between the client 702 and the server 704 over both Wi-Fi and cellular data links, at this point data packets may be transmitted over either or both MPTCP subflows.

As previously noted, such a scenario as illustrated in and described with respect to FIG. 7, in which a client includes both Wi-Fi and cellular network interfaces, of which both, one, or neither may be available at any given time, may be common for many mobile devices. Wi-Fi and cellular network interfaces may have disparate characteristics which may lead users of such devices to have use preferences with respect to those network interfaces. For example, many cellular networks may charge fees on a per data usage basis (i.e., may provide metered data usage, e.g., in lieu of or in addition to a monthly subscription fee), whereas many Wi-Fi network providers may not charge fees on a per data usage basis, but rather may provide unlimited data usage (e.g., for a monthly subscription fee). While it will be recognized that such characteristics are not universal features of cellular and Wi-Fi networks, because such characteristics may be common in many cases, many mobile applications may prefer to use cellular networks primarily or exclusively as a backup communication path, while Wi-Fi may be a preferred communication path when available.

Fixed endpoints may not have the same priorities. For example, a fixed endpoint with at least one wired network interface may not have significant variation in availability of its network interface(s), due both to the substantially stationary nature of the fixed endpoint and the higher degree of reliability/availability typically provided by a wired network interface relative to wireless network interfaces. Further, regardless of the fixed versus mobile nature of a remote endpoint of an MPTCP connection, a local endpoint may not be aware of differences in use preferences of the remote endpoint between different subflows. Accordingly, at least in some cases, when an MPTCP connection is established between a mobile endpoint and a fixed endpoint, it may be preferable to enable the mobile endpoint to dictate which of its network interfaces (and thus which MPTCP subflow) to use as the active path and which as the backup path. Correspondingly, it may not be desirable for a fixed endpoint to dictate the constraints of an MPTCP connection with a mobile endpoint.

It is also worth noting that more generally, regardless of whether fixed or mobile, a local endpoint may not be aware of any differences in use preferences of a remote endpoint between different subflows. Thus if both endpoints of an MPTCP connection are mobile, each side may have use preferences unknown to the other. For example, one endpoint may know which subflows use its cellular network interface and which subflows use its Wi-Fi network interface, but may not be aware of which subflows correspond to which network interfaces of the other endpoint, and vice versa.

It should be recognized that the above described examples relating to fixed- and mobile-endpoint network interface characteristics and use preferences are provided by way of explanation and should not be considered limiting to the disclosure. Any number of additional or alternative use preference profiles, network interface combinations, and/or variations in fixed & mobile endpoint combinations are also possible. However, these examples are illustrative, more generally, of the potential advantages of introducing additional elements of connection control and configuration to MPTCP connections.

For example, it may be desirable to provide a way for one or both endpoints to assert control over an MPTCP connection. In such a case, a controlling endpoint may be able to create new subflows, dictate priority (e.g., active/primary versus backup/secondary) of subflows, and control data transmission flow across primary and backup subflows to facilitate faster transitions to a functional subflow from a non-functional subflow. A non-controlling endpoint, in contrast, may not (e.g., may be prevented from or not have permission to) initiate new subflows or modify subflow priorities, and may follow the lead of the controlling endpoint with respect to data transmission flow across primary and backup subflows. For example, a non-controlling endpoint may monitor/determine on which MPTCP subflow data has most recently been received, and may transmit data over the MPTCP subflow on which data has most recently been received.

Thus, in an exemplary scenario in which a client (such as client 702) is a mobile client having both a Wi-Fi and a cellular network interface, while a server (such as server 704) is a fixed server having a wired network interface, the client might assert control over the MPTCP connection, while the server might not assert control over the MPTCP connection. The client might in this case dictate that the Wi-Fi subflow would be primary, and the server would not modify this priority. Further, the client might in this case choose whether or not to establish a cellular subflow, while the server would not attempt to initiate a subflow on the client's cellular network interface. Additionally, if the Wi-Fi network interface were to fail and the client transitioned to transmitting data on the (e.g., backup) cellular interface subflow, the server would follow the client's lead and also transmit data on the cellular interface subflow, even if the server does not receive an indication to elevate the priority of that subflow (e.g., due to unreliability of a priority modification option).

It may also be possible to provide a way for multiple endpoints to assert control over an MPTCP connection. This may be desirable, for example, in the above-described exemplary scenario in which both endpoints are mobile and have their own unique use preferences regarding network interfaces and corresponding subflows. In such a case, each side may be able to override any prior signaling of path priority and demote/promote path priority. Thus, for instance, if a subflow is set up from one endpoint's Wi-Fi network interface to the other endpoint's cellular network interface, the receiving endpoint may prefer to demote the priority of the subflow to backup if another subflow is available over its Wi-Fi network interface.

More generally, if both endpoints assert control over an MPTCP connection, both endpoints may be able to actively vote on subflow establishment and path priorities. For example, both endpoints may be able to initiate subflows. Both endpoints may also or alternatively be able to demote subflows from primary to backup priority and promote subflow priority from backup to primary (e.g., when no other path is available). Additionally, both endpoints may attempt to follow the other endpoint's lead with respect to over which subflow data most recently arrived. In other words, each endpoint may monitor/determine on which MPTCP subflow data has most recently been received, and may transmit data over the MPTCP subflow on which data has most recently been received whenever possible.

A further consideration with respect to subflow initiation may be that many mobile devices may reside behind network address translators (NATs). In such a case a mobile endpoint may not be able to directly advertise a local address for a remote endpoint to connect to using MPTCP's ADD_ADDR option. Even if the endpoints use an out of band mechanism for address discovery and NAT hole punching, it can be counter-productive for subflow creation to be dictated purely by the ADD_ADDR option, as the end-host receiving the ADD_ADDR option and initiating the connection may have no knowledge of the cost characteristics of the remote endpoint's network interfaces (e.g., wireless networks).

Accordingly, it may be preferable generally for mobile endpoints to be the initiators of subflows, and it may be preferable generally for fixed endpoints not to be the initiators of subflows with mobile endpoints, as they may not be aware of to which type of network interface (e.g., Wi-Fi or cellular) the mobile endpoint is connected, even if they have out of band mechanisms for discovering the mobile endpoints' translated/public transport addresses. In a scenario in which a fixed endpoint wishes to inform a mobile endpoint of an additional address at which an MPTCP subflow may be initiated, then, the fixed endpoint may send an ADD_ADDR option to the mobile endpoint for the mobile devices to connect to.

Control of an MPTCP connection may be asserted in any of a variety of ways. As one possibility, assignment of control may be achieved through (e.g., hardwired) configuration of the endpoints. Thus, an endpoint may be configured to be a master/controller of MPTCP connections (e.g., if a mobile endpoint) for all MPTCP connections involving that endpoint, or to be a slave/non-controller of MPTCP connections (e.g., if a fixed endpoint) for all MPTCP connections (e.g., for which the remote endpoint is configured to act as a master with respect to the MPTCP connection). As previously noted, hybrid fixed/mobile endpoints are also possible; in such a case, configuration may be used to treat such a device as either a mobile end-point or a fixed end point.

As another possibility, the MPTCP wire protocol may be used to dynamically assign/assume controllership. For example, a subflow initiator may initiate an MPTCP subflow with a Syn message having an MP_Capable option, such as Syn message 706 illustrated in FIG. 7. While it should be noted that alternate formats are also possible, one possible exemplary format for the MP_Capable option is illustrated in FIG. 8.

The 'version' field illustrated as shown may in this case be set to 1. In version 1, flag 'C' may be used for declaring controllership/asserting master status of the MPTCP connection. In this case 'C' would be set to 1.

An MPTCP capable receiver of such an MP_Capable option may respond with a Syn_Ack which also includes an MP_Capable option, such as Syn_Ack message 708 illustrated in FIG. 7. While again it should be noted that alternate formats are also possible, as one possibility this response MP_Capable option may have the exemplary format illustrated in FIG. 9.

If the receiver of the MP_Capable option is a fixed endpoint (or otherwise does not wish to assert control over the MPTCP connection), that endpoint may stop initiating subflows. That endpoint may also no longer set path priorities, and may follow the lead of the controlling endpoint when transitioning from one subflow to another. Such an endpoint may signal its non-controllership/assert slave status of the MPTCP connection by not setting the 'C' flag (i.e., setting the 'C' flag to 0) in its MP_Capable response if it supports version 1, and by setting the version field to 1.

If the receiver of the MP_Capable option is mobile endpoint (or otherwise does wish to assert control over the MPTCP connection), that endpoint may understand that the remote endpoint also wishes to assert control over the connection (e.g., because the remote endpoint may also be mobile), and may collaboratively allow path priorities to be promoted or demoted. Similarly, both endpoints may follow each others' lead in data transmission when switching from one subflow path to another subflow path. Such an endpoint may signal its controllership/assert master status of the MPTCP connection by setting the 'C' flag (i.e., setting the 'C' flag to 1) in its MP_Capable response if it supports version 1, and by setting the version field to 1.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, comprising:
a Wi-Fi network interface;
a cellular network interface;
a processing element operably coupled to the Wi-Fi network interface and the cellular network interface;
wherein the UE is configured to:
attempt to establish a multipath transmission control protocol (MPTCP) subflow with a remote endpoint over the Wi-Fi network interface;
attempt to establish a non-multipath transmission control protocol (TCP) connection with the remote endpoint over the Wi-Fi network interface if attempting to establish the MPTCP subflow with the remote endpoint over the Wi-Fi network interface is unsuccessful;
attempt to establish an MPTCP subflow with the remote endpoint over the cellular network interface if attempting to establish the non-multipath TCP connection with the remote endpoint over the Wi-Fi network interface is unsuccessful; and
attempt to establish a non-multipath TCP connection with the remote endpoint over the cellular network interface if attempting to establish the MPTCP connection with the remote endpoint over the cellular network interface is unsuccessful;
wherein if the non-multipath TCP connection with the remote endpoint over the Wi-Fi network interface is successfully established, no attempt is made to establish an MPTCP subflow with the remote endpoint over the cellular network interface.

2. The UE of claim 1, wherein the UE is further configured to:
attempt to establish an additional MPTCP subflow with the remote endpoint over the cellular network interface if attempting to establish an MPTCP subflow with a remote endpoint over the Wi-Fi network interface is successful.

3. The UE of claim 1, wherein to attempt to establish an MPTCP subflow, the UE is configured to attempt to perform a three-phase handshake procedure with the remote endpoint, wherein each message transmitted in the three-phase handshake procedure comprises a multipath TCP header option, wherein the UE is further configured to:
determine that each message in the three-phase handshake procedure with the remote endpoint is successfully received with its respective multipath TCP header option;
attempt to transmit or receive MPTCP data over the MPTCP subflow based on determining that each message in the three-phase handshake procedure with the remote endpoint is successfully received with its respective multipath TCP header option;
determine that the MPTCP data is received without a multipath TCP header option;
fall back to non-multipath TCP communication with the remote endpoint based on determining that the MPTCP data is received without the multipath TCP header option.

4. The UE of claim 1, wherein to attempt to establish an MPTCP subflow, the UE is configured to attempt to perform a three-phase handshake procedure with the remote endpoint, wherein each message transmitted in the three-phase handshake procedure comprises a multipath TCP header option, wherein the UE is further configured to:
determine that at least one message in the three-phase handshake procedure is not received;
perform one or more additional attempts to establish an MPTCP subflow with the remote endpoint;
attempt to establish a non-multipath TCP connection with the remote endpoint if the one or more additional attempts to establish an MPTCP subflow with the remote endpoint are unsuccessful.

5. The UE of claim 1,
wherein the UE is configured to monitor the network interface status of each of the Wi-Fi network interface and the cellular network interface,
wherein the UE is configured to preferentially perform data communications over the Wi-Fi network interface relative to the cellular network interface if both the Wi-Fi network interface and the cellular network interface are available.

6. A method for a wireless device to establish a multipath TCP (MPTCP) connection with a remote endpoint, wherein the wireless device comprises both a Wi-Fi network interface and a cellular network interface, the method comprising:
receiving information indicating availability status of each of the Wi-Fi network interface and the cellular network interface; and
attempting to establish an MPTCP subflow with a remote endpoint, wherein attempting to establish the MPTCP subflow with the remote endpoint is preferentially performed over the Wi-Fi network interface if the Wi-Fi network interface is available;
wherein said attempting to establish the MPTCP subflow with the remote endpoint comprises
attempting to establish an MPTCP subflow with the remote endpoint over the Wi-Fi network interface if it is determined that the Wi-Fi network interface of the device is currently available;
attempting to establish a standard transmission control protocol (TCP) connection with the remote endpoint over the Wi-Fi network interface if the attempt to establish the MPTCP subflow with the remote endpoint over the Wi-Fi network interface is unsuccessful; and
attempting to establish an MPTCP subflow with the remote endpoint over the cellular network interface if the attempt to establish a standard TCP connection with the remote endpoint over the Wi-Fi network interface is unsuccessful, and the cellular network interface is available.

7. The method of claim 6,
wherein if attempting to establish an MPTCP subflow with the remote endpoint over the cellular network interface is unsuccessful, the MPTCP subflow establishment attempt over the cellular network interface falls back to an attempt to establish a standard TCP connection with the remote endpoint over the cellular network interface.

8. The method of claim 6,
wherein attempting to establish the MPTCP subflow with the remote endpoint is performed over the cellular interface if a TCP connection fails to be established over the Wi-Fi network interface.

9. The method of claim 6, wherein the method further comprises:
determining that a first MPTCP subflow with the remote endpoint is successfully established over the Wi-Fi network interface;
determining that the cellular network interface is available; and
attempting to establish a second MPTCP subflow with the remote endpoint over the cellular network interface based on determining that the first MPTCP subflow with the remote endpoint is successfully established over the Wi-Fi network interface and determining that the cellular network interface is available.

10. The method of claim 6,
wherein the method is implemented by a transport connection management layer executing in the wireless device, wherein the transport connection management layer is configured to determine network interface use preferences based on one or more of:
network interface availability information;
network interface link quality characteristics; or
network interface use cost characteristics.

11. A non-transitory computer accessible memory medium comprising program instructions which, when executed at a processing element of a device, cause the device to implement a method, comprising:
receiving an indication to initiate a transmission control protocol (TCP) T-GP session with a remote endpoint;
determining whether or not a first network interface of the device is currently available;
determining whether or not a second network interface of the device is currently available;
attempting to establish a multipath transmission control protocol (MPTCP) an MPTCP subflow with the remote endpoint over the first network interface if it is determined that the first network interface of the device is currently available;
attempting to establish a single path TCP connection with the remote endpoint over the first network interface if the first network interface of the device is currently available but the attempt to establish the MPTCP subflow with the remote endpoint over the first network interface is unsuccessful; and
attempting to establish an MPTCP subflow with the remote endpoint over the second network interface if it is determined that the first network interface is currently unavailable and the second network interface is currently available, or if the first MPTCP subflow is successfully established and the second network interface is also available;
wherein if the single path TCP connection with the remote endpoint over the first network interface is successfully established, no attempt is made to establish an MPTCP subflow with the remote endpoint over the second network interface.

12. The memory medium of claim 11, the method further comprising:
wherein if the single path TCP connection with the remote endpoint over the first network interface is not successfully established and it is determined that the second network interface of the device is currently available, the method also comprises attempting to establish an MPTCP subflow with the remote endpoint over the second network interface.

13. The memory medium of claim 11,
wherein the first network interface is a Wi-Fi network interface,
wherein the second network interface is a cellular network interface.

14. A wireless user equipment (UE) device, comprising:
a first network interface;
a processing element operably coupled to the first network interface;
wherein the UE is configured to:
attempt to establish a multipath transmission control protocol (MPTCP) subflow with a remote endpoint over the first network interface;
wherein to attempt to establish the MPTCP subflow, the UE is configured to attempt to perform a three-phase handshake procedure with the remote endpoint, wherein each message transmitted in the three-phase handshake procedure comprises a multipath transmission control protocol (TCP) header option, wherein the UE is further configured to:
determine that each message in the three-phase handshake procedure with the remote endpoint is successfully received with its respective multipath TCP header option;
attempt to transmit or receive MPTCP data over the MPTCP subflow based on determining that each message in the three-phase handshake procedure with the remote endpoint is successfully received with its respective multipath TCP header option;
determine that the MPTCP data is received without a multipath TCP header option;
fall back to non-multipath TCP communication with the remote endpoint based on determining that the MPTCP data is received without the multipath TCP header option.

* * * * *